US009847186B2

(12) United States Patent
Wadzinski (10) Patent No.: US 9,847,186 B2
(45) Date of Patent: Dec. 19, 2017

(54) STARTER AND POWER EQUIPMENT UNIT INCORPORATING SAME

(71) Applicant: The Toro Company, Bloomington, MN (US)

(72) Inventor: Chris A. Wadzinski, Inver Grove Heights, MN (US)

(73) Assignee: THE TORO COMPANY, Bloomington, MN (US)

( * ) Notice: Subject to any disclaimer, the term of this patent is extended or adjusted under 35 U.S.C. 154(b) by 336 days.

(21) Appl. No.: 13/753,697

(22) Filed: Jan. 30, 2013

(65) Prior Publication Data
US 2014/0209050 A1    Jul. 31, 2014

(51) Int. Cl.
| *F02M 1/16* | (2006.01) |
| *H01H 13/14* | (2006.01) |
| *H01H 9/06* | (2006.01) |
| *A01D 34/68* | (2006.01) |
| *H01H 13/52* | (2006.01) |
| *H01H 57/00* | (2006.01) |

(Continued)

(52) U.S. Cl.
CPC ......... *H01H 13/14* (2013.01); *A01D 34/6818* (2013.01); *H01H 9/06* (2013.01); *H01H 3/12* (2013.01); *H01H 3/30* (2013.01); *H01H 3/3031* (2013.01); *H01H 13/52* (2013.01); *H01H 57/00* (2013.01); *H01H 2009/068* (2013.01); *H01H 2300/026* (2013.01)

(58) Field of Classification Search
CPC ........ H01H 3/30; H01H 3/3031; H01H 57/00; H01H 13/52

USPC .................. 200/318, 318.1, 341; 123/179.1; 180/19.3, 272; 56/10.5, 10.8
See application file for complete search history.

(56) References Cited

U.S. PATENT DOCUMENTS

| 452,397 A | 5/1891 | Straus |
| 604,874 A | 5/1898 | Brougham et al. |

(Continued)

FOREIGN PATENT DOCUMENTS

| DE | 40 39 652 C1 | 3/1992 |
| EP | 1 457 103 A1 | 9/2004 |

(Continued)

OTHER PUBLICATIONS

"Electric Snow Thrower—Model 050," MTD LLC, Operator's Manual, Form # 769-07058, Apr. 1, 2011, 20 pgs.

(Continued)

*Primary Examiner* — Jacob Amick
*Assistant Examiner* — Charles Brauch
(74) *Attorney, Agent, or Firm* — Mueting, Raasch & Gebhardt, P.A.

(57) ABSTRACT

A push-button starter for use with an outdoor power equipment unit. In one embodiment, the starter includes a housing defining an opening to receive a removable button, and a peripheral edge surrounding the opening. The peripheral edge may define two scalloped areas such that two opposite sides of a head portion of the button are exposed and accessible when the button is in a neutral position within the housing while remaining sides of the head portion are enclosed within the housing. Moreover, the opening and the head portion may be configured to control an orientation of the button relative to the housing, and further prevent rotation of the button relative to the housing.

19 Claims, 8 Drawing Sheets

(51) Int. Cl.
*H01H 3/12* (2006.01)
*H01H 3/30* (2006.01)

(56) References Cited

U.S. PATENT DOCUMENTS

| | | | |
|---|---|---|---|
| 1,464,979 A | 8/1923 | Farmer | |
| 1,581,924 A | 4/1926 | Greenlee | |
| 1,828,747 A | 10/1931 | Perry | |
| 2,546,744 A | 3/1951 | Hasselbaum | |
| 2,662,131 A | 12/1953 | Cerna et al. | |
| 3,257,517 A | 6/1966 | Sedley | |
| 3,603,065 A | 9/1971 | Weber | |
| 3,696,593 A | 10/1972 | Thorud et al. | |
| 3,940,585 A * | 2/1976 | Schaad | H01H 13/12 |
| | | | 200/16 C |
| 3,969,597 A | 7/1976 | Osika | |
| 3,982,082 A | 9/1976 | Thorud et al. | |
| 4,044,532 A | 8/1977 | Lessig, III | |
| 4,053,726 A * | 10/1977 | Schaad | H01H 13/52 |
| | | | 200/534 |
| 4,294,027 A | 10/1981 | Edwards | |
| 4,295,285 A | 10/1981 | Stevens | |
| 4,335,566 A | 6/1982 | Hurd | |
| 4,395,608 A | 7/1983 | Eicker et al. | |
| 4,430,848 A | 2/1984 | Wistrom | |
| 4,476,643 A | 10/1984 | Hilchey et al. | |
| 4,667,459 A | 5/1987 | Scanland et al. | |
| 5,050,371 A | 9/1991 | Tharman et al. | |
| D320,731 S | 10/1991 | Pink et al. | |
| D322,791 S | 12/1991 | Wada et al. | |
| 5,085,043 A | 2/1992 | Hess et al. | |
| 5,146,735 A | 9/1992 | McDonner | |
| 5,203,147 A | 4/1993 | Long | |
| 5,398,431 A | 3/1995 | Beihoffer et al. | |
| 5,444,199 A | 8/1995 | Burchard et al. | |
| 5,488,818 A | 2/1996 | Powers et al. | |
| 5,587,569 A | 12/1996 | Mohtasham | |
| 5,606,851 A | 3/1997 | Bruener et al. | |
| 5,657,542 A * | 8/1997 | White, III | A01D 34/4163 |
| | | | 30/276 |
| D390,576 S | 2/1998 | Shimamura | |
| 5,806,374 A | 9/1998 | Mizutani et al. | |
| RE36,250 E | 7/1999 | Hess et al. | |
| 6,018,937 A | 2/2000 | Shimada et al. | |
| D424,578 S | 5/2000 | Friberg et al. | |
| D436,114 S | 1/2001 | Beugelsdyk et al. | |
| 6,198,058 B1 | 3/2001 | Graninger et al. | |
| D448,389 S | 9/2001 | Katoh et al. | |
| 6,407,353 B1 | 6/2002 | Fritzinger et al. | |
| 6,470,602 B2 | 10/2002 | White, III et al. | |
| 6,622,683 B2 | 9/2003 | Gracyalny et al. | |
| 6,643,958 B1 | 11/2003 | Krejci | |
| 6,951,092 B2 | 10/2005 | Busboom et al. | |
| D524,824 S | 7/2006 | Shaffer et al. | |
| 7,071,436 B2 * | 7/2006 | Coates | H01H 27/00 |
| | | | 200/330 |
| D544,501 S | 6/2007 | Chung Lee | |
| 7,257,909 B2 | 8/2007 | Shaffer et al. | |
| D571,826 S | 6/2008 | Tanaka et al. | |
| 7,472,500 B2 | 1/2009 | White, III | |
| 7,624,521 B2 | 12/2009 | White, III et al. | |
| 7,730,577 B2 | 6/2010 | Wood | |
| D620,030 S | 7/2010 | Baetica | |
| D620,438 S | 7/2010 | Lewis et al. | |
| 7,762,049 B2 | 7/2010 | Eaton et al. | |
| D622,291 S | 8/2010 | Martin et al. | |
| D624,563 S | 9/2010 | Lowe et al. | |
| 7,886,706 B2 | 2/2011 | Grybush | |
| D642,595 S | 8/2011 | Martin et al. | |
| D648,354 S | 11/2011 | Hattori et al. | |
| D648,754 S | 11/2011 | Yuzuriha | |
| 8,168,899 B2 * | 5/2012 | Imai | F02N 11/0803 |
| | | | 200/43.03 |
| 8,171,907 B2 * | 5/2012 | Koenen | B60K 28/04 |
| | | | 123/179.3 |
| D676,876 S | 2/2013 | Martin et al. | |
| D692,027 S | 10/2013 | Martin et al. | |
| 2001/0008130 A1 | 7/2001 | Gracyalny et al. | |
| 2001/0037785 A1 | 11/2001 | Gracyalny et al. | |
| 2002/0011227 A1 | 1/2002 | Gracyalny | |
| 2002/0022855 A1 * | 2/2002 | Bobroff | A61M 5/158 |
| | | | 606/185 |
| 2005/0023834 A1 | 2/2005 | Coates | |
| 2009/0218207 A1 * | 9/2009 | Mou | H01H 13/52 |
| | | | 200/334 |
| 2010/0051425 A1 | 3/2010 | Imai et al. | |
| 2010/0181172 A1 * | 7/2010 | Monig | H03K 17/964 |
| | | | 200/181 |
| 2011/0118961 A1 * | 5/2011 | Koenen | B60K 28/04 |
| | | | 701/113 |
| 2013/0111864 A1 | 5/2013 | Hansen et al. | |
| 2013/0312566 A1 | 11/2013 | Shaffer | |
| 2014/0209050 A1 * | 7/2014 | Wadzinski | H01H 13/14 |
| | | | 123/179.1 |
| 2014/0224631 A1 * | 8/2014 | Hanaoka | H01Q 23/00 |
| | | | 200/341 |

FOREIGN PATENT DOCUMENTS

| | | |
|---|---|---|
| EP | 1 496 532 A1 | 1/2005 |
| EP | 1 570 721 A1 | 9/2005 |
| GB | 2 120 016 A | 11/1983 |
| GB | 2 403 852 A | 1/2005 |

OTHER PUBLICATIONS

"Dad Find |Sears Craftsman 22" Rear Drive Self-Propelled Electric Start EZ Law Mower" [online]. Apr. 2, 2012. [retrieved on Mar. 27, 2013]. Retrieved from the Internet:<URL:http://foodfamilyfinds.com/sears-craftsman-22-rear-drive-self-propelled-electric-start-ez-lawn-mower-review/>; 6 pgs.

"Craftsman 190cc* 22" Rear Drive Self-Propelled EZ Lawn Mower 50 states," [online], Sears Model No. 37093, including partial enlarged view. Nov. 9, 2011. [retrieved on Mar. 27, 2013]. Retrieved from the Internet: <URL: http://www.sears.com/she/s/p_10153_12605_07137093000P?prdNo=4>; 5 pages plus 1 page enlarged view, 6 pages total.

U.S. Appl. No. 29/444,358, filed Jan. 30, 2013, Martin et al.

U.S. Appl. No. 90/013,330, filed Sep. 3, 2014.

EP Patent Application No. 04254044.3, File History [online] as available Sep. 18, 2015. European Patent Office, Patent Register [retrieved on Sep. 18, 2015]. Retrieved from the Internet: <register.epo.org/application?number=EP04254044&lng=en&tab=doclist>.

U.S. Appl. No. 90/013,330, filed Sep. 3, 2014, Reexamination App.

* cited by examiner

STARTER AND POWER EQUIPMENT UNIT INCORPORATING SAME

Embodiments of the present invention relate generally to outdoor power equipment, and, more particularly, to an engine starter for use with the same.

BACKGROUND

Outdoor power equipment units such as rotary lawn mowers are known in the art. Typically, such mowers include a wheeled housing forming a cutting chamber inside which a cutting blade rotates. A handle assembly may extend, e.g., upwardly and rearwardly, from the housing to allow a walking operator to control the mower.

Rotary lawn mowers are generally powered by either petroleum-based (e.g., gasoline) internal combustion engines or, alternatively, electric motors. Before operating a gasoline-powered lawn mower, its engine must first be started. In many configurations, the lawn mower includes a starter cord that, when manually pulled by the operator, results in rotation of the engine crankshaft at a speed sufficient to start the engine. Such a starter arrangement can be supplemented, or even replaced by, an electric starter system having an electric motor configured to initiate crankshaft rotation, and a start switch configured to control the electric motor. The switch may be located within a switch housing accessible to the operator. The switch is typically activated by means of a key rotatably inserted into a key slot formed in the switch housing. Once the key is inserted into the key slot and adequately rotated, the switch may selectively close a circuit formed between the starter motor and a source of electrical power (e.g., an on-board battery). When the engine starts, the key may be released, whereby it returns to an operating position within the key slot.

The key is advantageous as it offers, for example, an intuitive interface for engine starting, as well as the ability to disable starting (e.g., by removing the key) when so desired. However, while key start systems are effective, the key must be constructed of a sufficiently strong material (e.g., metal) so as to prevent it from breaking off within the key slot as a result of normal use, misuse, and damage. Moreover, the key slot must also be of a similar robust construction. Accordingly, inclusion of conventional key start mechanisms may result in higher than desired manufacturing costs.

SUMMARY

The present invention may overcome these and other issues by providing, in one embodiment, an electric starter for a power equipment unit, wherein the starter includes: a button having a shaft portion and an enlarged head portion; and a housing defining an opening configured to receive the shaft portion and the head portion such that, when the button is in a neutral position within the opening, the shaft portion is contained within the housing and at least part of the head portion is surrounded by the housing. The housing may include: a deflectable tab configured to engage the head portion and retain the button within the housing when the button is in the neutral position; and a peripheral edge surrounding the opening. The peripheral edge may define two or more notched areas such that two opposite sides of the head portion may be grasped from outside the housing when the button is in the neutral position.

In another embodiment, an electric starter for a power equipment unit is provided that includes: a button having a shaft portion and an enlarged head portion; and a housing defining an opening configured to removably receive the shaft portion therein such that, when the button is inserted into the housing and positioned at a neutral position within the opening, the shaft portion is contained within the housing. The housing may include: a deflectable tab configured to engage the head portion and retain the button in the neutral position; and a peripheral edge surrounding the opening. The peripheral edge may define two scalloped areas such that two opposite sides of the head portion are exposed and accessible when the button is in the neutral position while remaining sides of the head portion are surrounded by the housing. The opening and the head portion are configured to control an orientation of the button relative to the housing, and further minimize rotation of the button relative to the housing.

In yet another embodiment, a power equipment unit is provided that includes: a ground-engaging implement; an internal combustion engine operatively coupled to the implement and configured to power the same; an electric starter motor operatively coupled to the engine; and a push-button electric starter attached to the implement. The starter comprises: a button comprising: a shaft portion; and an enlarged head portion located at an end of the shaft portion; and a housing defining an opening configured to removably receive the shaft portion therein such that, when the button is inserted and at a neutral position within the opening, the shaft portion is contained within the housing. The housing includes: a resilient tab configured to engage the head portion and retain the button in the neutral position; and a peripheral edge surrounding the opening. The peripheral edge may define two scalloped areas such that two opposite sides of the head portion are exposed and accessible when the button is in the neutral position while remaining portions of the head portion are surrounded by the housing, wherein the opening and the head portion are configured to control an orientation of the button relative to the housing, and further minimize rotation of the button relative to the housing.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

Embodiments of the present invention will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments of the invention. The lack of illustration/description of such structure/components in a particular figure is, however, not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Embodiments of the instant invention are directed to starters and starter systems for use with outdoor power equipment units (e.g., walk-behind rotary lawn mowers), and to power equipment units incorporating the same. In one embodiment, the starter may be configured as a push-button starter. Such a push-button starter may provide the desired durability and simple operation, while also potentially providing lower manufacturing cost as compared to a conventional key-and-slot starter configuration.

Figure 1:
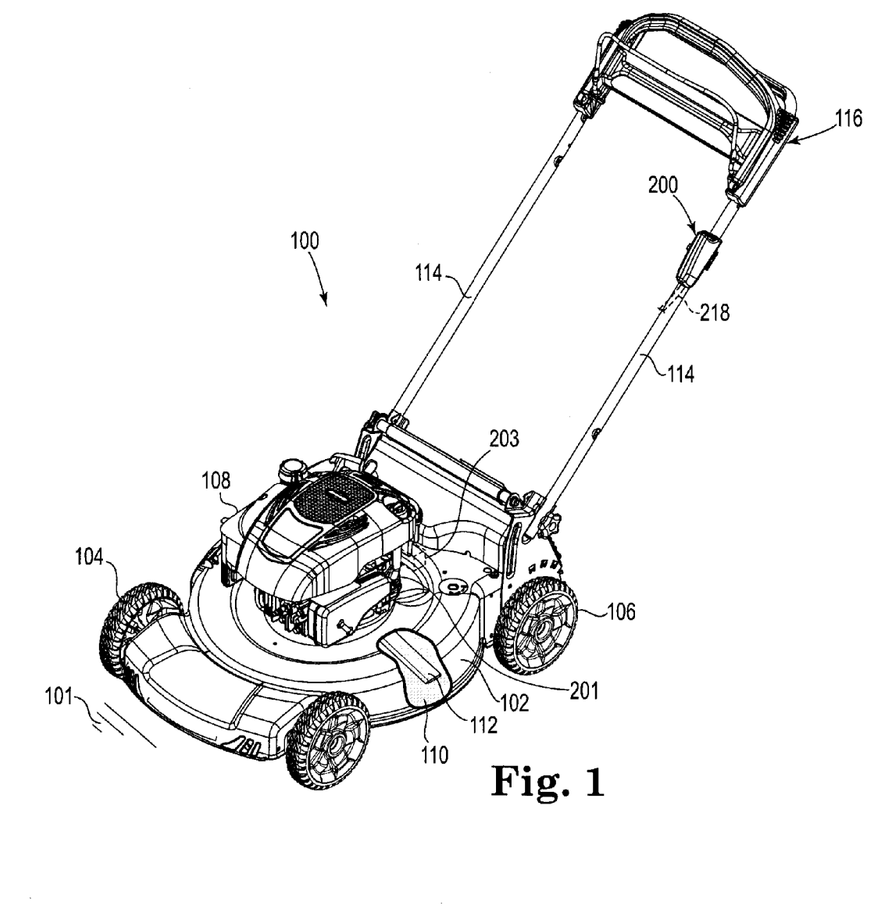
FIG. 1 is an upper front perspective view of an outdoor power equipment unit, e.g., walk-behind lawn mower, incorporating a starter, e.g., push-button starter, in accordance with one embodiment of the invention.

With reference to the figures of the drawing, wherein like reference numerals designate like parts and assemblies throughout the several views, FIG. 1 illustrates an outdoor power equipment unit in a typical operating configuration. Once again, the power equipment unit may be a ground-engaging implement such as a walk-behind lawn mower 100. However, while illustrated herein in the context of a walk-behind lawn mower, such a configuration is not limiting as starters in accordance with embodiments of the present invention may find application with most any power equipment unit, e.g., snowthrowers, roto-tillers, aerators, de-thatchers, sod cutters, etc.

It is noted that the terms "comprises" and variations thereof do not have a limiting meaning where these terms appear in the accompanying description and claims. Further, "a," "an," "the," "at least one," and "one or more" are used interchangeably herein.

Moreover, relative terms such as "left," "right," "front," "fore," "forward," "aft," "rear," "rearward," "top," "bottom," "side," "upper," "lower," "above," "below," "horizontal," "vertical," and other relative terms may be used herein and, unless otherwise stated, are from the perspective of one operating the mower 100 while the mower is in a normal operating configuration, e.g., while the mower 100 is positioned such that wheels 104, 106 rest upon a generally horizontal ground (e.g., lawn) surface 101 as shown in FIG. 1. These terms are used herein to simplify the description, however, and not to limit the scope of the invention in any way.

As shown in FIG. 1, the exemplary mower 100 may include a housing or deck 102 supported in rolling engagement with the ground surface 101 by a plurality of ground engaging wheels, e.g., front wheels 104 and rear wheels 106 (only one rear wheel visible in FIG. 1) positioned, respectively, at front and rear ends of the mower 100. In some embodiments, the mower 100 is self-propelled in that one or more wheels 104, 106 are powered.

The deck 102 preferably forms an upper surface to which is mounted a prime mover, e.g., a gasoline-powered internal combustion engine 108. The engine 108 may be oriented such that its crankshaft (not shown) extends vertically downward through the upper surface of the deck 102 and into a partially enclosed cutting chamber 110 defined, at least in part, by the deck. A cutting member, e.g., a cutting blade 112, may attach to an end of the crankshaft. During operation, the crankshaft may rotate the cutting blade 112 at a speed sufficient to sever grass and other vegetation over which the mower 100 passes during operation.

The mower 100 may further include one or more handle support members 114 that extend from the deck 102 generally rearwardly and upwardly to form an operator handle assembly 116. During use, an operator walking behind the mower 100 may control mower operation via manipulation of the handle assembly 116 and/or various controls located on or near the handle assembly. In some embodiments, the handle assembly 116 may be configured in a manner similar to that illustrated in U.S. Pat. No. D424,578 to Friberg et al.

Figure 2:
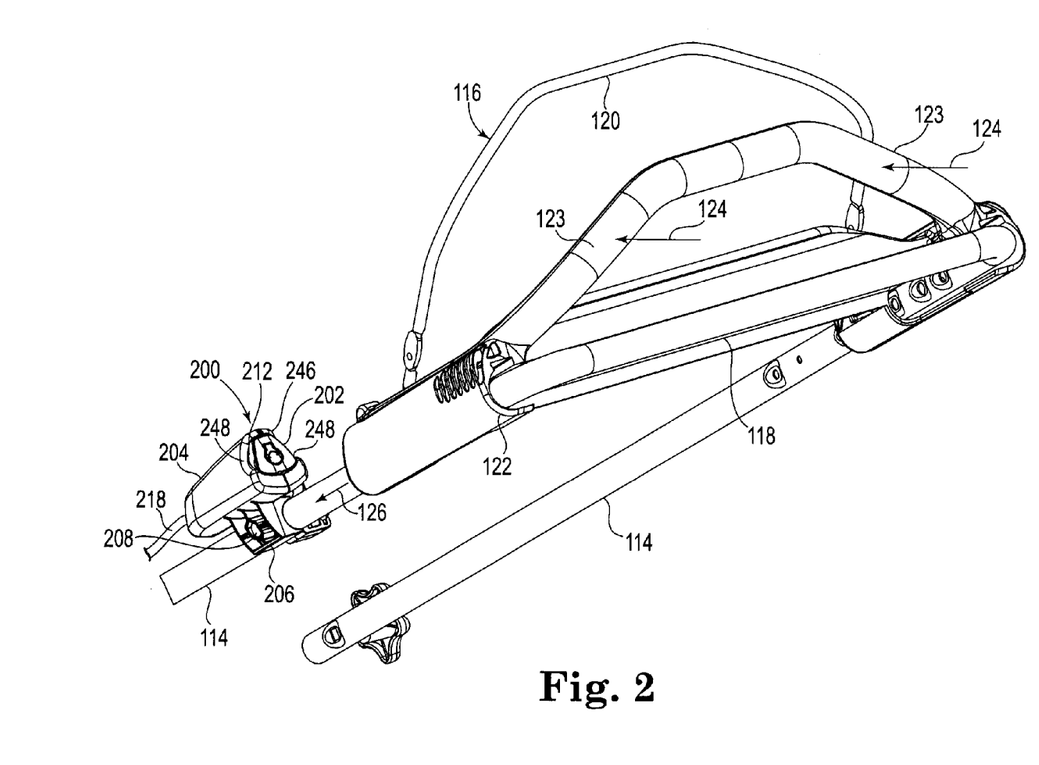
FIG. 2 is a partial upper rear perspective view of the mower of FIG. 1 showing the exemplary starter with a starter button inserted into a starter housing and positioned in a neutral position.

FIG. 2 is an upper, rear partial perspective view of the mower 100 further illustrating the handle assembly 116. As shown in this view, the support members 114 may be joined by a cross member 118 to form a substantially U-shaped structure. The handle assembly 116 may include an operator presence control (OPC) lever 120 as is generally known in the art. In the illustrated embodiment, the OPC lever 120 is pivotally attached to a forward portion of a drive control member 122. To start the mower 100, the OPC lever 120 may be pivoted until it rests against a rear or handle portion 123 of the drive control member 122, at which point the engine 108 (See FIG. 1) may be started as described below. After the engine is started, the operator may selectively propel the mower 100 forward by displacing, with his or her hands, the drive control member 122 in the forward direction, e.g., by pushing the handle portion 123 in the direction 124. Such a force causes the drive control member 122 to slide along the handle support members 114 (e.g., in the direction 126). This sliding motion displaces a drive system connection (not shown), which initiates power delivery to one or more of the wheels 104, 106 (see FIG. 1).

As further shown in FIG. 2, the exemplary mower 100 may also include an electric starter, e.g., a push-button starter 200, in accordance with one embodiment of the invention. The exemplary starter 200 may be attached to one (e.g., the left) of the handle support members 114 as illustrated. While not wishing to be bound to any specific construction, the starter 200 may include a housing 204 defining a clamp 206, the latter configured to surround and attach to the handle support member 114. A fastener (e.g., hex-head bolt 208 and nut 210 (nut visible in FIGS. 4 and 5)) may pass through the clamp 206 and the handle support member 114 to secure the starter 200 to the handle support member. As further described below, the starter may electrically connect to a starting system (including at least an electric starter motor 201 and battery 203 operatively attached to the mower as diagrammatically shown in FIGS. 1, 7, and 9) via a cable 218. Accordingly, the starter 200 may function as a switch to engage the starter motor to start the engine 108 as further described below. In other embodiments, the battery could be replaced by another power source such as external AC power without departing from the scope of the invention.

Figure 3:
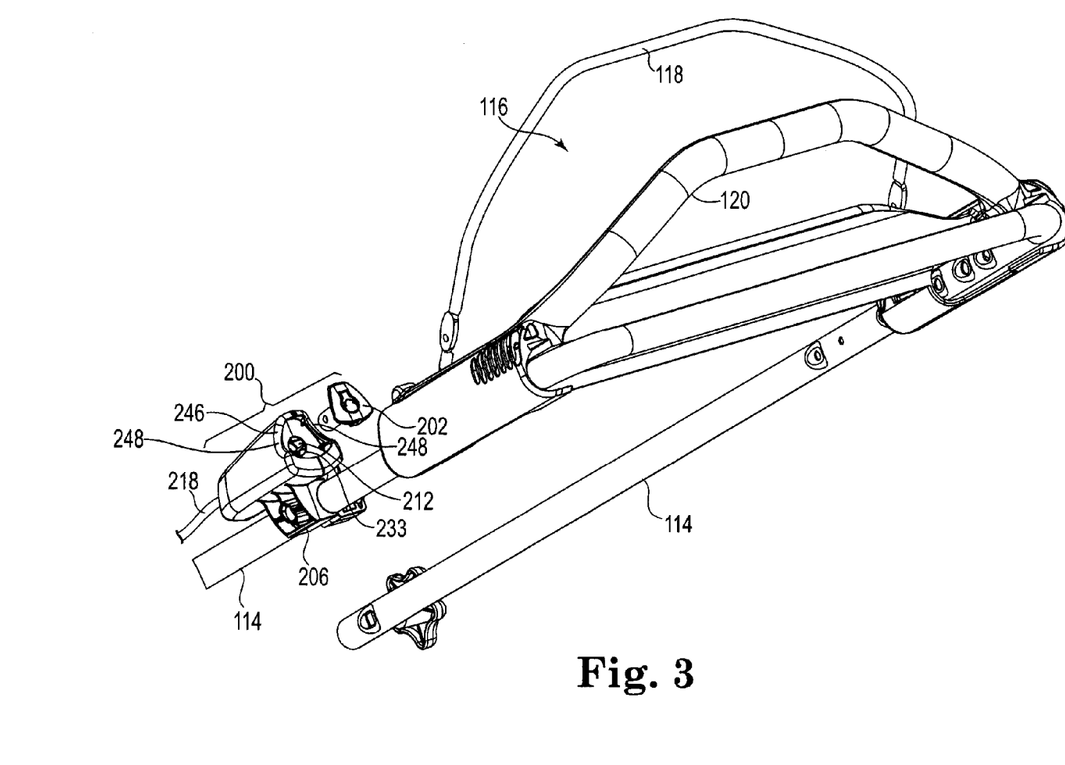
FIG. 3 is a view similar to FIG. 2, but with the button shown removed from the starter housing.

The starter 100 may further include a button 202 that is shown, in FIG. 2, positioned within an opening 212 formed in the housing 204. As further described below, the button 202 is shown in FIG. 2 in a neutral (non-starting) position. To start the mower, the button 202 may be depressed or pushed inwardly into the housing 204 to a depressed or engaged (starting) position. When in the depressed position, the button closes an electric start switch 222 (see FIG. 6) as further described below. Moreover, as illustrated in FIG. 3, the button 202 may be manually removed from the starter housing 204 (e.g., from the opening 212) when so desired. With the button 202 removed, the ability to start the engine, at least via the electric start system, is effectively disabled.

Figure 4:
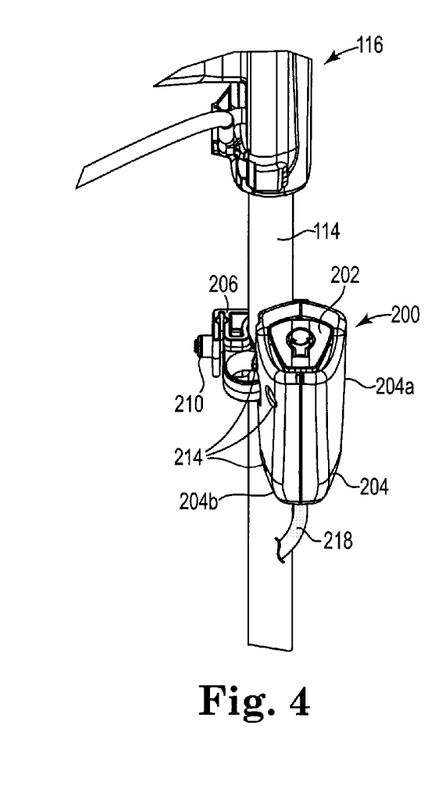
FIG. 4 is a top plan view of the starter as installed on a handle of the exemplary mower of FIGS. 1-2.
Figure 5:
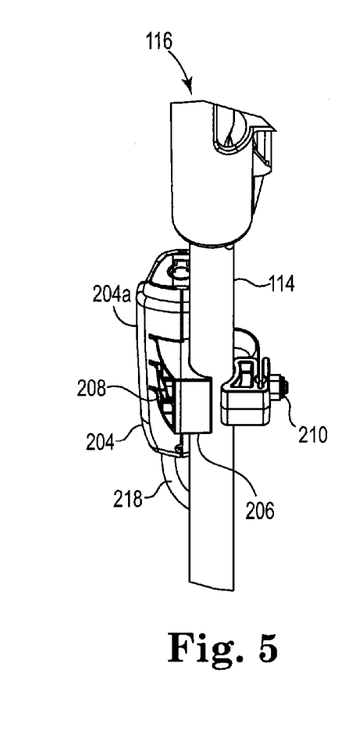
FIG. 5 is a bottom plan view of the starter of FIG. 4.

FIG. 4 is a top plan view of the starter 200 of FIGS. 1 and 2 (e.g., as installed on the handle support member 114 of the mower 100), while FIG. 5 is a bottom plan view of the same. As shown in these views, the housing 204 may be formed of two halves 204a and 204b. In the illustrated embodiment, one half, e.g., the outboard half 204a, may be integrally formed with the clamp 206. The clamp 206 may define a cylindrical ring similar in size and shape to the handle support member 114. The clamp 206 may also be made of a resilient material that is sufficiently deflectable to permit it to slide over the member 114 and then be tightly clamped to the member 114 with the bolt 208 and the nut 210. The other half of the housing 204, e.g., inboard half 204b, may attach to the first half via fasteners 213 (see FIG. 6) that may insert into clearance openings 214 in the half 204b and threadably engage lugs 216 (see also FIG. 6) in the half 204a.

Figure 6:
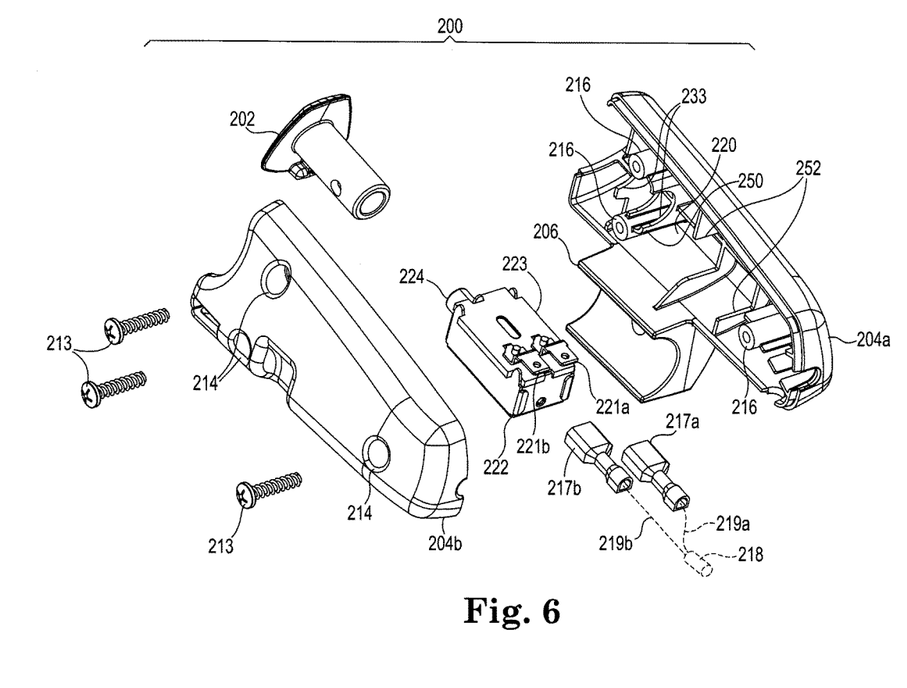
FIG. 6 is an exploded view of the starter of FIG. 1-2.

The starter 200 (e.g., housing halves 204a and 204b) may define an interior cavity 220 (when assembled) as shown in the exploded view of FIG. 6. The start switch 222 may be contained within the housing 204, e.g., held within the cavity 220, via one or more ribs 252 formed on the housing halves 204a, 204b. As shown in FIG. 6, the switch 222 may include two contacts 221 (contacts 221a, 221b) configured to connect to respective conductors 219 (conductors 219a, 219b) of the cable 218, e.g., via connectors 217 (connectors 217a, 217b).

Figure 7:
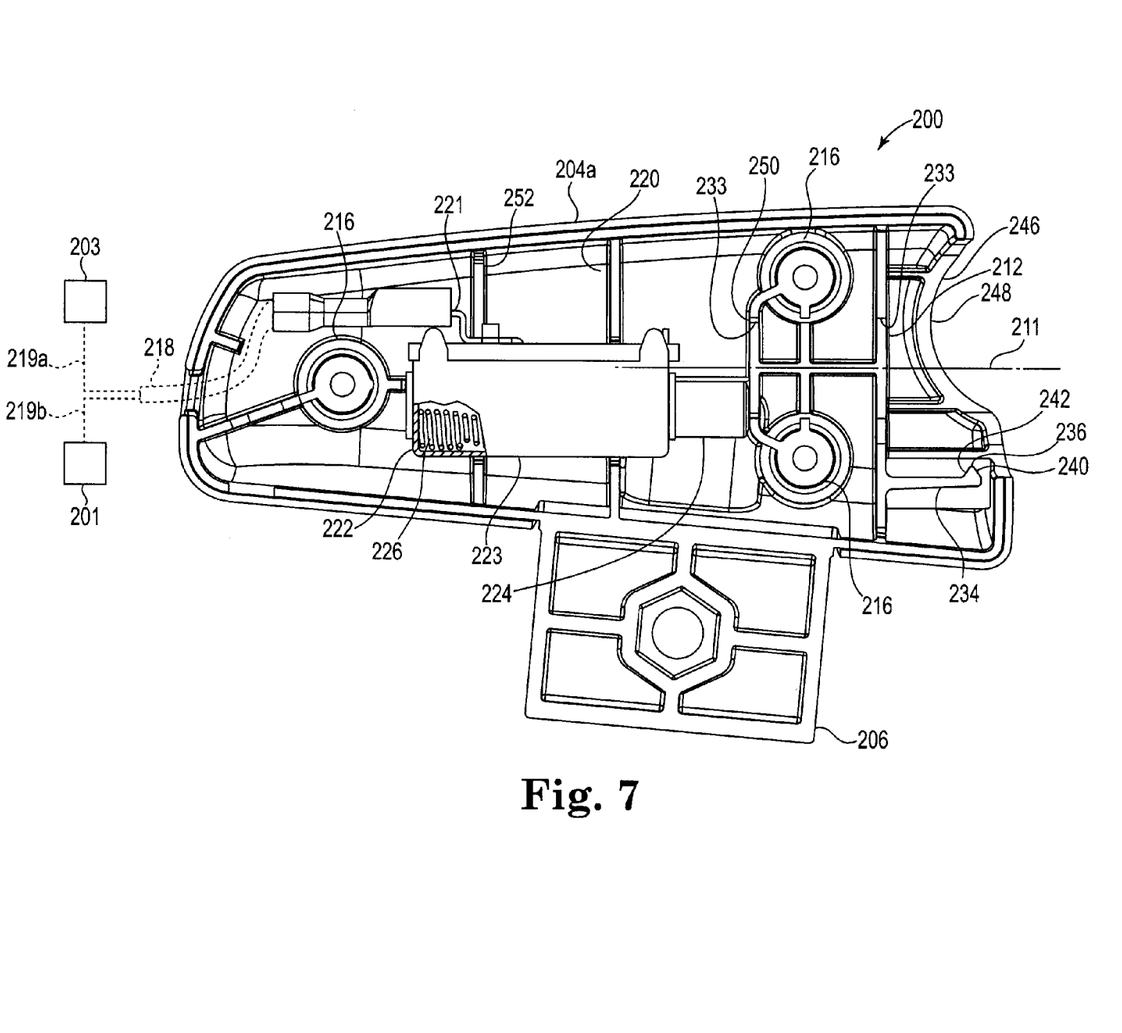
FIG. 7 is a side view of the exemplary starter housing of FIGS. 1-2 with the button and one side of the housing removed.
Figure 8:
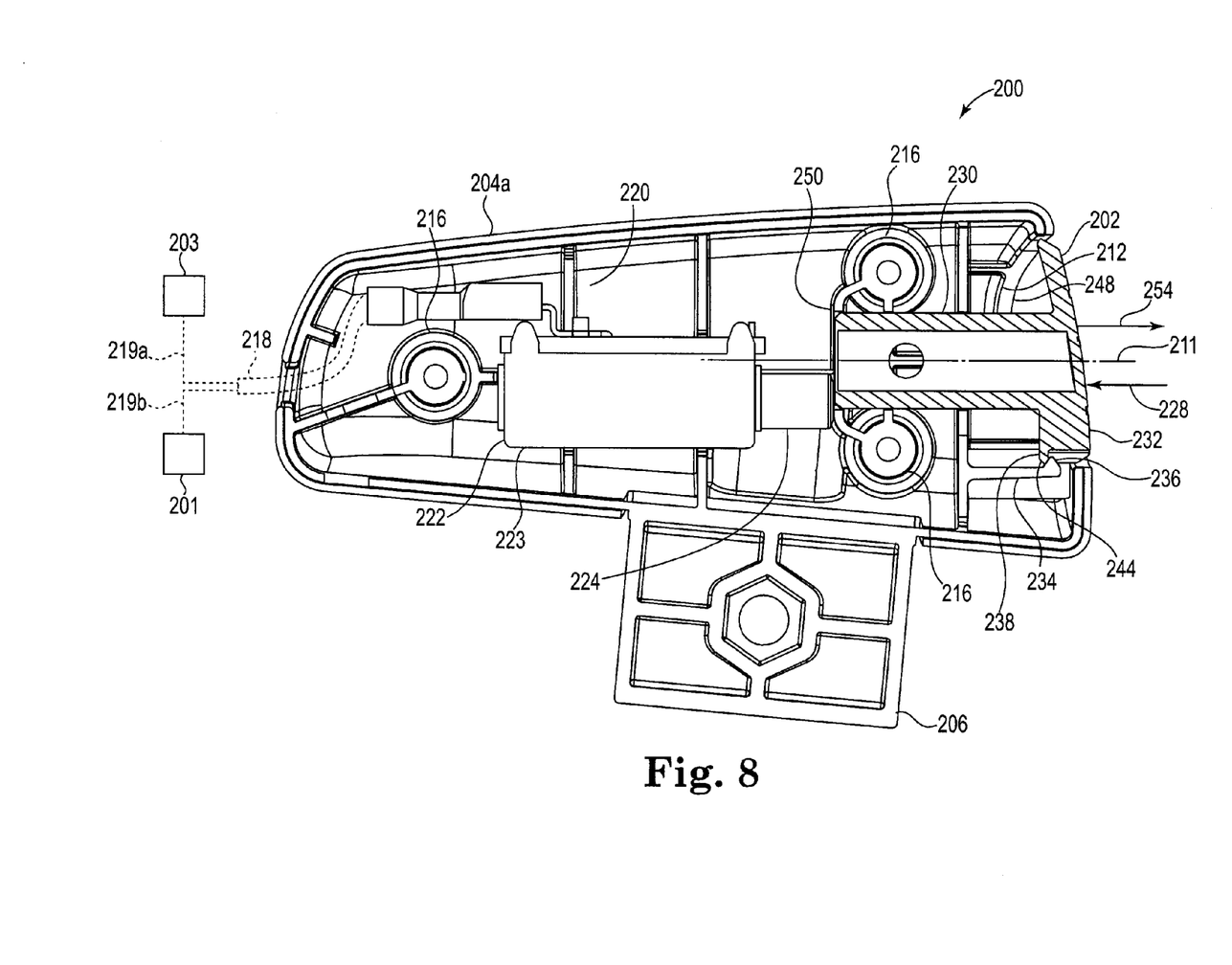
FIG. 8 is a side view similar to FIG. 7, but with the button inserted into the housing and located in the neutral position.
Figure 9:
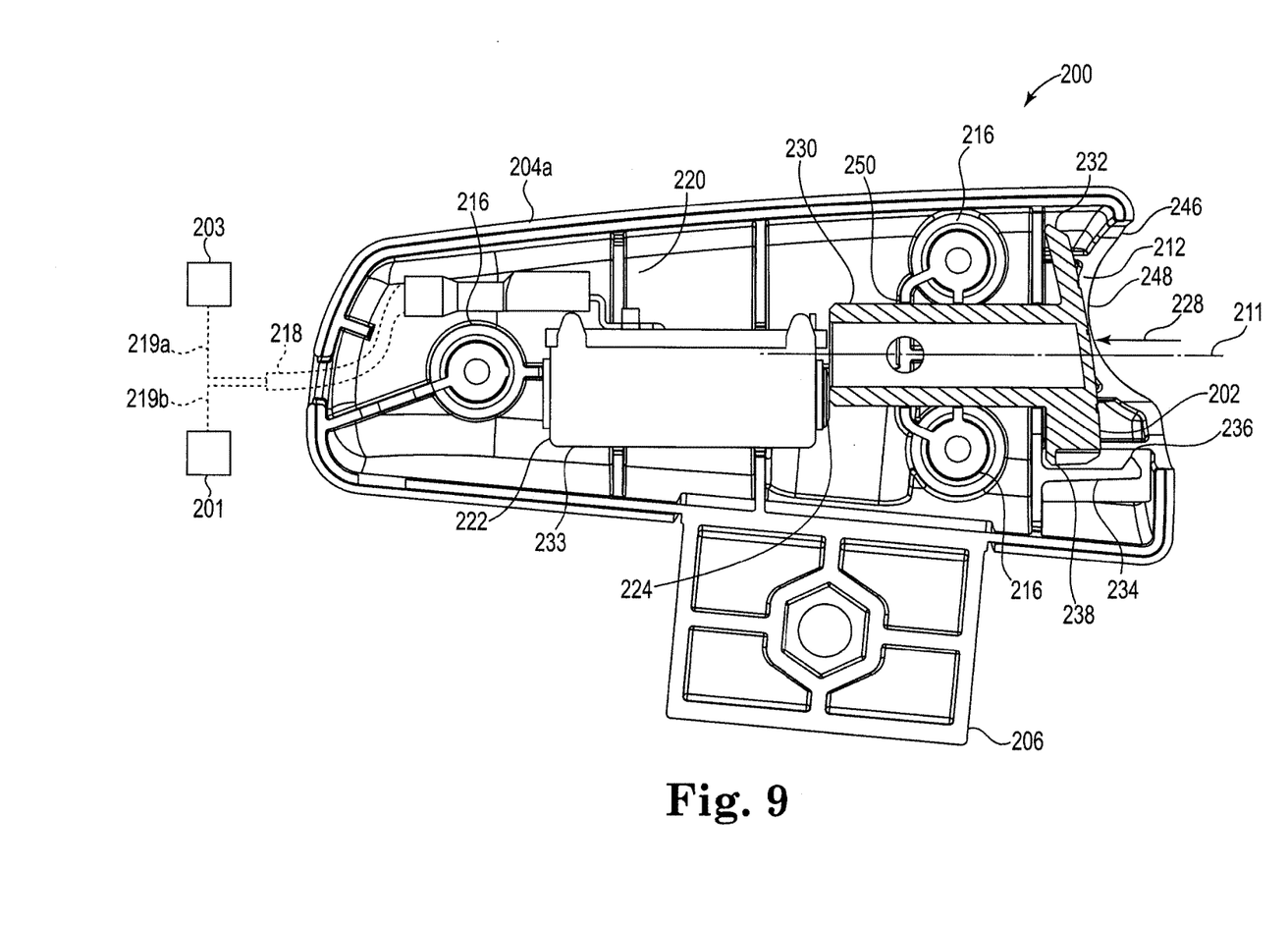
FIG. 9 is a side view similar to FIG. 8, but with the button inserted into the housing and shown in a depressed position.

FIGS. 7-9 illustrate a partial side view of the housing 204 (e.g., a view of the interior of half 204a with the half 204b removed) showing the interior cavity 220. As shown in these views, the switch 222 may include a plunger 224 in communication with the opening 212 so that the plunger may contact an end of the shaft portion 230 and thus be responsive to movement of the button 202 as further described below. While a variety of switches may be utilized without departing from the scope of the invention, the switch 222 may, in one embodiment, be a model 6B638N distributed by Indak Manufacturing Corp. of Northbrook, Ill., USA. This is a normally open push-button switch with an outwardly biased plunger 224. When the plunger is in its normal (e.g., extended) state as shown in FIGS. 7 and 8, the switch 222 is open and current cannot flow from the battery 203 (or other power source) to the electric starter motor 201. That is, with the plunger extended, there is no electrical connection between the conductors 219a and 219b (see FIG. 6). However, when the plunger is depressed (e.g., pushed inwardly into the switch by action of the button 202) as shown in FIG. 9, the switch 222 closes, thereby permitting current flow from the battery to the electric starter motor (i.e., the conductors 219a, 219b are electrically connected) to start the engine 108.

With reference first to FIG. 7, the starter 200 is shown with the button 202 removed entirely from the housing 204. As shown in this view, the switch includes a body 223 that is fixed relative to the walls of the housing 204, e.g., via the ribs 252. The plunger 224 extends outwardly from the body 223 into, or at least towards, the opening 212. In the illustrated embodiment, the plunger 224 is configured to move (via displacement of the button) along an axis that is parallel to, but offset from, an axis 211 of the opening 212/shaft portion 230 (the axis along which the button 202 translates). The plunger 224 may be biased to this first, outward or open position by a biasing member, e.g., spring 226, contained within the body 223 of the switch 222. Once again, when the plunger 224 is extended (e.g., the switch is in the open position), no current may flow through and thus the starter motor may not energize.

FIG. 8 illustrates a view similar to FIG. 7, but with the button 202 inserted into the opening 212 of the housing 204 and located in the neutral position. With the plunger 224 in the outward position as shown, the switch 222 remains in the open (plunger extended) position. However, when the button 202 is depressed (e.g., pushed inwardly into the cavity 220 along the axis 211 by a force 228 applied by the operator) from the neutral position of FIG. 8 to the depressed position of FIG. 9, the plunger 224 is forced into the body 223 of the switch 222 against the force of the spring 226. That is, the plunger 224 moves from the first (normally open) state or position (corresponding to the neutral position of the button 202 and a de-energized state of the starter motor) shown in FIG. 8, to a second or closed state or position (corresponding to the depressed position of the button and an energized state of the starter motor) as illustrated in FIG. 9. Stated another way, when the plunger reaches the closed position of FIG. 9, the switch 222 is closed, thereby completing the electrical circuit between the battery 203 and the starter motor 201. As a result, the engine 108 may turn over and start. Once the engine 108 is started, the force 228 applied to the button 224 may be released. With the force 228 released, the plunger may return to its first or extended position under the biasing force of the spring 226. As the plunger 224 returns to the extended position, the switch correspondingly returning to its open position, while the button 202 correspondingly returns to the neutral position (due to the biasing force applied by the spring 226 of the plunger 224) shown in FIG. 8.

With particular reference to FIGS. 8 and 9, the button 202 may, in one embodiment, include a shaft portion 230 and an enlarged head portion 232 located at one end of the shaft portion. The opening 212 of the housing may be configured to receive both the shaft portion 230 and the head portion 232 such that, when the button 202 is in the neutral position within the opening, the shaft portion is surrounded by the housing 204. Moreover, at least part of the head portion 232 may be surrounded by the housing 204 when the button is in this position. Stated alternatively, the button 202 may be generally contained within the housing 204 when the button is in the neutral position. Such a configuration may reduce the chances of inadvertent snagging of the button 202, e.g., on clothing or vegetation.

In the illustrated embodiment, the shaft portion 230 may, when viewed along the axis 211, be cylindrically-shaped, while the head portion 232 may be non-cylindrically shaped, e.g., elongated or oblong-shaped (when viewed along the same axis 211). As a result, the opening 212 may be effectively stepped to accommodate the button, e.g., an inner portion of the opening 212 (e.g., the portion defined by surfaces 233; see FIG. 6) may be correspondingly cylindrically-shaped to receive with clearance the shaft portion 230, while an outer portion of the opening may be larger and non-cylindrically shaped (e.g., elongated or oblong-shaped) to receive with clearance the head portion 232.

To assist with containing the button 202 within the opening 212, the housing may further include a resilient (elastically deflectable) arm or tab 234 configured to engage the button (e.g., engage the head portion 232) and prevent inadvertent withdrawal of the button outwardly beyond its neutral position. The tab 234 may be located inside the housing 204 (e.g., in the opening 212) and may form one or more teeth 236 that engage a corresponding tab 238 formed on the button 202. The tooth 236 may form one or more ramped edges 240/242 as shown in FIG. 7 (alternatively or in addition, the tab 238 may form a ramped edge 244) that may assist with deflection of the tab 234 during button 202 insertion into/removal from the opening 212. For example, when the button 202 is inserted into the opening 212, the ramp 244 may contact the ramp 240. Further insertion may cause the ramps 244 and 240 to slide relative to one another, resiliently deflecting the tab 234 downwardly (when viewed in FIGS. 7-9). However, once the tab 238 moves inwardly beyond the tooth 236, the tab 234 may return to its undeflected position, permitting the tooth 236 to effectively engage the tab 238, and thus the button 202. This engagement may effectively prevent inadvertent removal or withdrawal of the button 202 past the neutral position (see FIG. 8). The holding force resulting from engagement of the tooth 236/tab 238 may be greater than the spring force exerted on the plunger 224 by the spring 226. As a result, the button 202 may remain retained within the housing 204 after the force 228 applied to start the engine 108 and/or insert the button is released.

In the illustrated embodiment, the plunger 224 is, when the switch 222 is installed in the housing 204, configured to abut a rib 250 as shown in FIG. 8 (see also FIGS. 6 and 7). The shaft portion 230 of the button 202 may then, when in the neutral position, be configured to be in contact with, or slightly spaced-away from, the plunger. In other embodiments, the neutral position of the button 202 may correspond to slight depression of the plunger 224. Such a configuration may apply a slight preload to the button 202 when the latter is in the neutral position, thereby minimizing axial play.

The button 202 is preferably removable from the housing 204 so that activation of the electric starter motor may be disabled. To permit removal of the button 202, the housing 204 may define a peripheral edge 246 surrounding the opening 212. The peripheral edge 246 may define two or more notched or scalloped areas 248 (see also FIGS. 2 and 3) such that two opposite sides of the head portion 232 are exposed or otherwise accessible (e.g., able to be grasped by the operator's fingers) from outside the housing when the button 202 is in the neutral position. However, with the button in the neutral position, the remaining portions or sides of the head portion 232 remain surrounded by the housing 204 as shown in FIG. 2. Accordingly, to remove the button 202 from the housing 204, the operator may place a thumb and forefinger into the notches 248, grasp the corresponding two opposite sides of the head portion 232 of the button, and pull the button with a pulling force 254 sufficient to overcome the retention force provided by engagement of the tooth 236/tab 238. In some embodiments, a slight twisting force may also be applied to assist with removal of the button 202.

While the head portion 232 of the button 202 is partially accessible (e.g., by the thumb and forefinger), when the button is in the neutral position, the opening 212 may be configured to permit the head portion to move completely inside the housing (e.g., the head portion 232 (including the two opposite sides graspable when the button is in the neutral position) may be completely surrounded by the housing) when the button is in the depressed position as shown in FIG. 9. Stated alternatively, the opening 212 may be sized to permit the head portion 202 to selectively pass into and out of the opening.

In the illustrated embodiments, the outer portion of the opening 212 may be non-cylindrical to provide a more elongate shape better suited to incorporation of the notches 248. In this embodiment, the head portion 232 of the button 202 is preferably of a size and shape that corresponds to the shape of the respective outer portion of the opening 212. Stated another way, the opening 212 may be configured to receive the head portion 232 with clearance and to control an orientation (rotation) of the button 202 relative to the housing 204. By restricting insertion of the button (e.g., the head portion 232) to only one orientation relative to the opening 212 of the housing 204 (and by restricting rotation of the button once inserted within the housing), indicia (e.g., mower operational symbols such as an "engine start" symbol) provided on a face of the head portion (see, e.g., FIG. 3) may be consistently oriented for operator viewing.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are described and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. An electric starter for a power equipment unit, the starter comprising:
   a button comprising a shaft portion and an enlarged head portion, wherein the head portion comprises a tab and the shaft portion comprises a cylindrical surface lacking protrusions along its length; and
   a housing defining an opening configured to receive the shaft portion and the head portion such that, when the button is in a neutral position within the opening, the shaft portion is contained within the housing and at least part of the head portion is surrounded by the housing, wherein the housing comprises:
      a deflectable tab comprising a tooth, the tooth configured to engage the tab of the head portion and retain the button within the housing when the button is in the neutral position; and
      a peripheral edge surrounding the opening, the peripheral edge defining two or more notched areas such that two opposite sides of the head portion may be grasped from outside the housing when the button is in the neutral position.

2. The starter of claim 1, further comprising a start switch contained within the housing, the switch having a plunger in communication with the opening of the housing.

3. The starter of claim 2, wherein the button is movable, along an axis of the opening, from the neutral position corresponding to a first position of the plunger, to a depressed position, corresponding to a second position of the plunger.

4. The starter of claim 3, wherein the head portion, when the button is in the depressed position, is completely surrounded by the housing.

5. The starter of claim 2, further comprising a biasing member configured to bias the button toward the neutral position.

6. The starter of claim 5, wherein the biasing member is contained within the start switch.

7. The starter of claim 1, wherein the tooth is located inside the housing within the opening.

8. The starter of claim 1, wherein the head portion, when viewed along an axis of the shaft portion, is oblong-shaped.

9. An electric starter for a power equipment unit, the starter comprising:
   a button comprising a shaft portion and an enlarged head portion, wherein the head portion comprises a tab and the shaft portion comprises a cylindrical surface lacking protrusions along its length; and
   a housing defining an opening configured to removably receive the shaft portion therein such that, when the button is inserted into the housing and positioned at a neutral position within the opening, the shaft portion is contained within the housing, the housing comprising:
      a deflectable tab comprising a tooth, the tooth configured to engage the tab of the head portion and retain the button within the housing when the button is in the neutral position; and
      a peripheral edge surrounding the opening, the peripheral edge defining two scalloped areas such that two opposite sides of the head portion are exposed and accessible when the button is in the neutral position while remaining sides of the head portion are surrounded by the housing, wherein the opening and the head portion are configured to control an orientation of the button relative to the housing, and further minimize rotation of the button relative to the housing.

10. The starter of claim 9, wherein the button is configured for removal from the housing by application of a pulling force applied to the two opposite sides of the head portion.

11. The starter of claim 9, further comprising an electric switch contained within the housing, the switch having a plunger extending into the opening of the housing, the plunger configured to contact an end of the shaft portion.

12. The starter of claim 11, wherein the button is movable, along an axis of the opening, from the neutral position corresponding to a first position of the plunger, to a depressed position, corresponding to a second position of the plunger.

13. The starter of claim 12, wherein, when the button is in the depressed position, the two opposite sides of the head portion are positioned within the opening and surrounded by the housing.

14. The starter of claim 9, wherein the switch further comprises a biasing member configured to bias the plunger toward the button.

15. The starter of claim 9, wherein the opening is shaped to restrict insertion of the head portion therein until the head portion is rotated, about an axis of the head portion, to a predetermined position.

16. A power equipment unit comprising:
   a ground-engaging implement;
   an internal combustion engine operatively coupled to the implement and configured to power the same;
   an electric starter motor operatively coupled to the engine; and
   a push-button electric starter attached to the implement, the starter comprising:
      a button comprising: a shaft portion; and an enlarged head portion located at an end of the shaft portion, wherein the head portion comprises a tab and the shaft portion comprises a cylindrical surface lacking protrusions along its length; and
      a housing defining an opening configured to removably receive the shaft portion therein such that, when the button is inserted and at a neutral position within the opening, the shaft portion is contained within the housing, wherein the housing comprises:
         a resilient tab comprising a tooth, the tooth configured to engage the tab of the head portion and retain the button within the housing when the button is in the neutral position; and
         a peripheral edge surrounding the opening, the peripheral edge defining two scalloped areas such that two opposite sides of the head portion are exposed and accessible when the button is in the neutral position while remaining portions of the head portion are surrounded by the housing, wherein the opening and the head portion are configured to control an orientation of the button relative to the housing, and further minimize rotation of the button relative to the housing.

17. The unit of claim 16, wherein the housing contains a switch selectively configurable between: a normally open state corresponding to a de-energized state of the starter motor; and a closed state corresponding to an energized state of the starter motor, wherein the button is configured to move within, and along an axis of, the opening between: the neutral position corresponding to the normally open state of the switch; and a depressed position corresponding to the closed state of the switch.

18. The unit of claim 16, wherein the opening of the housing is defined by a cylindrically shaped portion configured to receive the shaft portion of the button, and a non-cylindrically shaped portion configured to receive the head portion of the button.

19. The unit of claim 17, wherein, when the button is in the depressed position, the two opposite sides of the head portion are within the opening and surrounded by the housing.

* * * * *